(12) United States Patent
Babrowicz

(10) Patent No.: US 6,291,038 B1
(45) Date of Patent: Sep. 18, 2001

(54) MULTILAYER SHRINKABLE FILM WITH IMPROVED SHRINK, OPTICS AND SEALABILITY

(75) Inventor: Robert Babrowicz, Spartanburg, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 08/078,479

(22) Filed: Jun. 22, 1993

Related U.S. Application Data

(63) Continuation-in-part of application No. 07/907,725, filed on Jul. 2, 1992, now abandoned.

(51) Int. Cl.$^7$ .................... B32B 27/30; B29D 22/00
(52) U.S. Cl. ............... 428/34.9; 428/35.2; 428/35.5; 428/518; 428/520; 428/913; 426/106; 156/244.11; 156/244.24; 53/441; 53/451; 53/453
(58) Field of Search .................... 428/35.2, 35.4, 428/516, 518, 520, 34.9, 35.5, 913; 426/106; 264/514; 156/244.11, 244.24; 53/441, 451, 453

(56) References Cited

U.S. PATENT DOCUMENTS

| | | | |
|---|---|---|---|
| 3,555,604 | * | 1/1971 | Pahlke .................. 425/72.1 |
| 3,741,253 | * | 6/1973 | Brax et al. .............. 138/137 |
| 3,953,557 | * | 4/1976 | Brax et al. .............. 264/22 |
| 4,352,844 | * | 10/1982 | Bornstein et al. ........ 428/34.9 |
| 4,424,243 | * | 1/1984 | Nishimoto et al. ....... 428/36 |
| 4,640,856 | * | 2/1987 | Ferguson et al. ........ 428/34.9 |
| 4,680,330 | * | 7/1987 | Berrier et al. .......... 524/230 |
| 4,801,486 | * | 1/1989 | Quacquarella .......... 428/34.9 |
| 4,837,084 | * | 6/1989 | Warren ................. 428/349 |
| 4,863,769 | * | 9/1989 | Lustig et al. ........... 428/34.9 |
| 4,976,898 | * | 12/1990 | Lustig et al. ........... 264/22 |
| 5,041,316 | * | 8/1991 | Parnell et al. .......... 428/35.4 |
| 5,059,481 | * | 10/1991 | Lustig et al. ........... 428/34.9 |

FOREIGN PATENT DOCUMENTS

0217252 * 4/1987 (EP).
0447988 * 9/1991 (EP).
WO 87/07880 * 12/1987 (WO).

OTHER PUBLICATIONS

US Introducing Very Low . . . Plastics Technology Sep. 1984–p. 113.*
US BP Chemicals Outlines . . . EP Plastics News Dec. 1984–p. 4.*
US Ultralow Density PE's . . . Plastics World Oct. 1984–p. 86.*
US New Kind of Polyethylene. Plastics Technology Oct. 1984–pp. 13/15.*
US Stamylex PE DSM Feb. 1984.*

* cited by examiner

Primary Examiner—Rena L. Dye
(74) Attorney, Agent, or Firm—Marc B. Quatt

(57) ABSTRACT

A heat shrinkable film with improved shrink characteristics has ethylene vinyl acetate copolymer with nine to twenty percent by weight vinyl acetate, with narrow molecular weight distribution and a high degree of short chain branching. A multilayer embodiment includes a first layer of an acid copolymer, an ethylene alpha olefin copolymer, or blends of the two; and a second layer of ethylene vinyl acetate copolymer with nine to twenty percent by weight vinyl acetate, with narrow molecular weight distribution and a high degree of short chain branching. Another embodiment includes a first layer of an acid copolymer, an ethylene alpha olefin copolymer, and blends thereof; a second layer of ethylene vinyl acetate copolymer with nine to twenty percent by weight vinyl acetate, with narrow molecular weight distribution and a high degree of short chain branching; a third layer of a barrier copolymer; a fourth layer of ethylene vinyl acetate copolymer with nine to twenty percent vinyl acetate, with narrow molecular weight distribution and a high degree of short chain branching; and a fifth layer of an ethylene alpha olefin copolymer.

26 Claims, 1 Drawing Sheet

MULTILAYER SHRINKABLE FILM WITH IMPROVED SHRINK, OPTICS AND SEALABILITY

CROSS REFERENCE TO RELATED APPLICATIONS

This application is a Continuation-In-Part of U.S. patent application Ser. No. 07/907,725, filed Jul. 2, 1992, now abandoned.

BACKGROUND OF THE INVENTION

This invention relates generally to thermoplastic, packaging films, and more particularly to a shrinkable film with improved heat-shrinkability properties, optics or strength. In certain multilayer embodiments, the films also have improved sealing characteristics, such as easier sealability and improved seal strength, particularly in the presence of grease.

Shrinkable thermoplastic films have many useful applications in the packaging industry for food and non-food products. A heat shrinkable bag can be made from such films that has widespread use for meat and dairy products. Multilayer heat shrinkable films commonly contain ethylene-vinyl-acetate copolymers in one or more layers due to its toughness and low temperature shrinking characteristics.

A packaging film known by U.S. Pat. No. 3,741,253 comprises a core layer of a vinylidene chloride copolymer (commonly known as saran) between a layer of ethylene-vinyl acetate copolymer and a layer of cross-linked ethylene-vinyl acetate copolymer. Vinylidene chloride copolymer is abbreviated as PVDC and ethylene vinyl acetate copolymer as EVA.

A method for producing a film of EVA and PVDC is disclosed in U.S. Pat. No. 3,953,557 wherein the EVA has a narrow molecular weight distribution. The saran composition is a blend of emulsion and suspension polymerized saran or is a saran composition that includes emulsion polymerized vinylidene chloride of the type generally considered suitable for liquid coating.

U.S. Pat. No. 4,352,844, commonly assigned herewith to W. R. Grace & Co.-Conn., discloses a multilayer, heat shrinkable, thermoplastic film which comprises at least two EVA layers, the first EVA layer being a surface layer and the second layer being adjacent thereto. The EVA copolymer of the first layer has a higher melting temperature than the EVA copolymer of the second layer. The EVA copolymers in both layers are cross-linked and each layer is stretch oriented. The first and second layers form the substrate to which other layers can be added.

In one embodiment, the film has third and fourth layers wherein the third layer is a barrier layer that comprises a thermoplastic material having low gas permeability such as vinylidene chloride copolymer or hydrolyzed ethylene-vinyl acetate copolymer (hereinafter abbreviated as EVOH, and also known as ethylene-vinyl alcohol copolymer) and the fourth layer comprises an ethylene-vinyl acetate copolymer.

U.S. Pat. No. 4,640,856, which is commonly assigned herewith to W. R. Grace & Co.-Conn. and incorporated herein by reference, discloses multilayer films having a heat sealing VLDPE (very low density polyethylene) layer, an oxygen barrier layer, and at least a further outer layer, preferably a VLDPE layer. The patent discloses a multilayer thermoplastic barrier film having at least three layers comprising: (a) a layer consisting essentially of very low density polyethylene having a density of less than 0.910 gms/cc; (b) a barrier layer comprising a material selected from the group consisting of: (1) copolymers of vinylidene chloride and (2) hydrolyzed ethylene-vinyl acetate copolymers; (c) a thermoplastic polymeric layer, said layer being on the side of the barrier layer opposite to that of layer (a); and (d) the shrinkage of layer (a) controlling the shrinkage of the entire multilayer barrier film, said multilayer film having been oriented and rendered heat shrinkable at a temperature below 100° C. (212° F.), said orientation temperature being about 40° F. or more below the melt temperature of the very low density polyethylene.

U.S. Pat. No. 4,801,486 also to W. R. Grace & Co.-Conn. discloses a thermoplastic multilayer packaging film comprising at least five layers in which one surface layer is a heat sealing layer and one of the internal layers is a barrier layer. The heat sealing surface layer comprises a copolymer of ethylene and an alpha-olefin having four to eight carbon atoms per molecule and the copolymer comprises ninety percent to seventy-five percent ethylene and ten percent to twenty-five percent alpha-olefin having four to eight carbon molecules and a density of less than 915 kg/m$^2$. This material is called very low density linear polyethylene (VLDPE). Additionally, the heat sealing layer may comprise a blend of the copolymer above with an ethylene/vinyl acetate copolymer or an ethylene/butyl-acrylate copolymer.

A packaging film suitable for making bags and pouches and commonly assigned to W. R. Grace & Co.-Conn. is disclosed in U.S. Pat. 4,837,084, wherein a multilayer heat shrinkable film has at least one layer comprising a copolymer of ethylene and an alpha-olefin with six or more carbon atoms per molecule with the VLDPE copolymer having a density of about 0.910 g/cc or less and a melt index of about 2 or less. The entire disclosure of U.S. Pat. No. 4,837,084 is incorporated herein by reference.

A variety of embodiments of heat-shrinkable films are disclosed in U.S. Pat. No. 4,863,769 wherein in one embodiment the film may be a biaxially oriented monolayer film of a very low density polyethylene copolymer (VLDPE) with a density under 0.910 g/cc. In another embodiment, the film may be a biaxially oriented multilayer film comprising a first outer layer of an ethylene-vinyl acetate copolymer, a core layer of a barrier material such as a polyvinylidene chloride copolymer or an ethylene-vinyl alcohol copolymer, and a second outer layer comprising a blend of an ethylene-vinyl acetate copolymer and a very low density polyethylene copolymer with a density under 0.910 g/cc. The films are made by the double bubble method of Pahlke, U.S. Pat. No. 3,555,604.

U.S. Pat. No. 4,976,898, which is a Divisional of U.S. Pat. No. 4,863,769, discloses a method of manufacturing a heat shrinkable biaxially oriented thermoplastic film by extruding a primary tube, including very low density polyethylene with a density under 0.910 g/cc, heating the primary tube and biaxially stretching the heated primary tube using the double bubble method of Pahlke, U.S. Pat. No. 3,555,604, to form a tube which is heat-shrinkable.

Another multilayer film structure is disclosed in U.S. Pat. No. 5,041,316, assigned to W. R. Grace & Co.-Conn., wherein there is taught a multilayer thermoplastic shrinkable film with improved processing properties comprising at least a heat sealing VLDPE layer, a core oxygen barrier layer, an outer thermoplastic layer and also comprising a further intermediate VLDPE layer between the barrier and the outer thermoplastic layer.

A biaxially oriented, heat shrinkable film is disclosed by U.S. Pat. No. 5,059,481, which is a Continuation of U.S. Pat.

No. 4,976,898, the film comprising VLDPE copolymer which comprises ethylene copolymerized with higher alpha olefins containing from four to eight carbon atoms such as butene, pentene, hexene, heptene and octene, and which has a density under 0.910 g/cc.

European Patent Application 91104044.2, (Publication No. 0447988, published Sep. 25, 1991), Forloni, Fornasiero, and Parnell, assignors to W. R. Grace & Co.-Conn., discloses a multilayer thermoplastic film from which containers may be made, said film having a thermosealing layer, a gas barrier layer, and at least one additional polymeric layer characterized in that the thermosealing layer can be sealed to itself to form a container with an opening through which a product may be loaded into the container and after the container has been loaded, the film can be sealed to itself through contaminants left by the product to hermetically close the container, said thermosealing layer comprising a copolymer selected from ethylene-methacrylic acid (EMAA) copolymers with methacrylic acid (MAA) content of about 4% to about 18% by weight, ethylene acrylic acid (EAA) copolymers with an acrylic acid (AA) content of from about 4% to about 22% by weight, and their blends.

Desirable properties in multilayer packaging films frequently include improved shrinkability, improved optics and improved sealability through contamination. Although multilayer packaging films in the prior art may satisfy some of the needs in the packaging art, room for improvement exists in pursuit of a packaging film with improved characteristics over materials used in the past.

OBJECTS AND SUMMARY OF THE INVENTION

It is thus an object of the present invention to provide a packaging film with improved heat shrinkability characteristics over prior packaging films.

It is still yet another object of the present invention to provide a packaging film having improved strength characteristics relative to other packaging film.

It is yet another object of the present invention to provide a packaging film having improved optics relative to other packaging films.

In certain multilayer embodiments, it is an object of the present invention to provide the above-mentioned characteristics of improved optics, improved heat shrinkability and improved strength characteristics, and also to provide some other objects as follows.

Thus, it is another object of the present invention to provide a multilayer heat shrinkable packaging film having improved sealability characteristics over films used in the past.

It is another object of the present invention to provide a multilayer heat shrinkable packaging film with improved grease resistance over packaging films used in the past.

Finally, for the certain multilayer embodiments, it is an object of the present invention to provide a multilayer packaging film combining the above advantages, i.e. improved sealability through contamination, improved grease resistance, improved optics, improved heat shrinkability characteristics and improved strength characteristics.

These and other objects are accomplished by a thermoplastic heat shrinkable film having improved shrink characteristics comprising ethylene vinyl acetate copolymer with nine to twenty percent by weight vinyl acetate, with narrow molecular weight distribution and a high degree of short chain branching.

In certain multilayer embodiments these and other objects are accomplished by a thermoplastic heat shrinkable film having improved shrink characteristics comprising a first sealing layer comprising a material selected from the group consisting of an acid copolymer, an ethylene alpha olefin copolymer (EAO), and blends thereof; and a second layer comprising ethylene vinyl acetate copolymer with nine to twenty percent by weight vinyl acetate, with narrow molecular weight distribution and a high degree of short chain branching.

The term "ethylene alpha olef in copolymer" (EAO) as used herein includes such heterogeneous materials as linear low density polyethylene [LLDPE], and very low and ultra low density polyethylene [VLDPE]; and homogeneous materials such as metallocene catalyzed polymers such as those supplied by Exxon, and Tafmer materials supplied by Mitsui. These materials generally include copolymers of ethylene with one or more comonomers selected from $C_4$ to $C_{10}$ alpha olefins such as butene-1, hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. "LLDPE" as defined herein has a density usually in the range of from about 0.916 grams per cubic centimeter to about 0.940 grams per cubic centimeter. EAO available from Dow as Insite(TM) is also included as a type of ethylene alpha olefin copolymer useful in the present invention.

In a preferred embodiment, the present invention also provides a thermoplastic multilayer heat shrinkable film comprising a first layer comprising a material selected from the group consisting of an acid copolymer such as ethylene-methacrylic acid or ethylene-acrylic acid, an ethylene alpha olefin copolymer (EAO), and blends thereof; a second layer comprising ethylene vinyl acetate copolymer with nine to twenty percent by weight vinyl acetate with narrow molecular weight distribution and a high degree of short chain branching; a third layer comprising a barrier copolymer; a fourth layer comprising ethylene vinyl acetate copolymer with nine to twenty percent by weight vinyl acetate, with narrow molecular weight distribution and a high degree of short chain branching; and a fifth layer comprising an ethylene alpha olefin copolymer (EAO).

Therefore, the present invention provides a thermoplastic heat shrinkable film having improved shrink characteristics comprising ethylene vinyl acetate copolymer with nine to twenty percent by weight vinyl acetate, with narrow molecular weight distribution and a high degree of short chain branching.

The present invention also provides a bag formed from tubular film according to the above paragraph, where the bag is formed by a transverse seal across the flattened tube and the mouth is formed by severing the tube at a predetermined distance from said transverse seal.

Also, in certain multilayer embodiments, the present invention provides a thermoplastic multilayer heat shrinkable film having improved shrink, optics, toughness or sealability characteristics comprising a first sealing layer comprising a material selected from the group consisting of an acid copolymer, an ethylene alpha olefin copolymer (EAO), and blends thereof; and a second layer comprising ethylene vinyl acetate copolymer with nine to twenty percent by weight vinyl acetate, with narrow molecular weight distribution and a high degree of short chain branching.

The present invention also provides a bag formed from tubular film according to the above paragraph, where the first layer is the face of the inner tube wall wherein the bottom of the bag is formed by a transverse seal across the flattened tube and the mouth is formed by severing the tube at a predetermined distance from said transverse seal.

The present invention also provides a thermoplastic multilayer heat shrinkable film having improved shrink characteristics comprising a first sealing layer comprising a material selected from the group consisting of an acid copolymer, an ethylene alpha olefin copolymer (EAO), and blends thereof; a second layer comprising ethylene vinyl acetate copolymer with nine to twenty percent by weight vinyl acetate, with narrow molecular weight distribution and a high degree of short chain branching; a third layer comprising a barrier copolymer; a fourth layer comprising ethylene vinyl acetate copolymer with nine to twenty percent by weight vinyl acetate, with narrow molecular weight distribution and a high degree of short chain branching; and a fifth layer comprising an ethylene alpha olef in copolymer (EAO).

The present invention also provides a bag formed from tubular film according to the above paragraph, where the first layer is the face of the inner tube wall wherein the bottom of the bag is formed by a transverse seal across the flattened tube and the mouth is formed by severing the tube at a predetermined distance from said transverse seal.

BRIEF DESCRIPTION OF THE DRAWING

In accordance with the invention.

DETAILED DESCRIPTION

Figure 1:
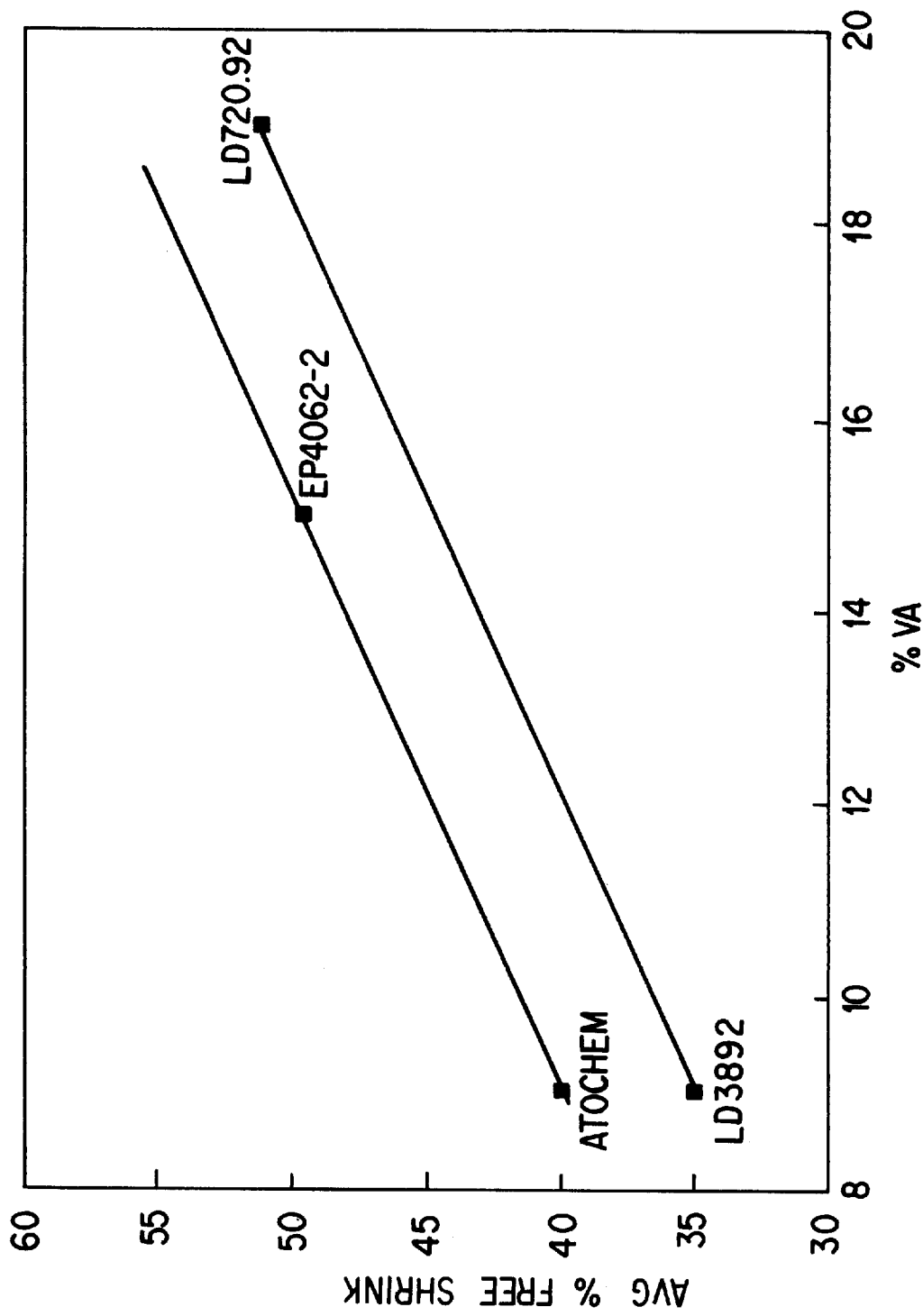
FIG. 1 shows a graph comparing films of the present invention with comparative films.

It has been found according to this invention that a novel shrinkable packaging film can be provided which has improved heat shrinkability relative to prior packaging films. In certain multilayer embodiments, the film can show improvement in one or more of the following: optics, strength, sealability through contamination, grease resistance, seal strength, and instantaneous seal strength.

Various other features and advantages will become apparent from a reading of the following description.

In a preferred embodiment, the film according to the present invention comprises heat shrinkable film having improved shrink characteristics comprising ethylene vinyl acetate copolymer with nine to twenty percent by weight vinyl acetate, with narrow molecular weight distribution and a high degree of short chain branching. This EVA copolymer provides more heat shrinkability in a multilayer film made from the EVA, other factors being equal, than prior art EVAs at equivalent levels of vinyl acetate. Utilization of this EVA can further provide improved optics and improved strength characteristics. Such EVAs are commercially available from Mitsui-duPont under the sales code V5714 or V5711. These materials have a vinyl acetate (VA) content of 15% and 13% by weight respectively. A similar resin avail able from duPont is EP 4062-2, having a 15% VA. Another commercially available resin is Lacqtene 1020 from Atochem. This is an EVA with 9% VA.

In a preferred multilayer embodiment, the first layer, which can act as a seal layer, comprises an acid copolymer such as ethylene-methacrylic acid or ethylene-acrylic acid, an ethylene alpha olefin copolymer (EAC) having a density of less than about 0.915 g/cc, or blends thereof. Utilizing either or both of these as the seal layer provides improved sealability characteristics through contamination and improved grease resistance. EMAA is sold by duPont under the tradename Nucrel, EAA is sold by Dow under the tradename Primacor, VLDPE is sold by Dow under the tradename Attane, and ULDPE is sold by Union Carbide under the tradename Ucarflex. Other suitable EAO's are mentioned elsewhere in this specification.

In another preferred embodiment, the film according to the present invention comprises at least five layers including the following: a first layer of an acid copolymer such as ethylene-methacrylic acid (EMAA) or ethylene-acrylic acid (EAA), an ethylene alpha olefin copolymer (EAC) with a density less than about 0.915 g/cc, or blends thereof; a second layer of ethylene vinyl acetate copolymer (EVA) with nine to twenty percent by weight vinyl acetate, with narrow molecular weight distribution and a high degree of short chain branching; a third layer of vinylidene chloride copolymer (PVDC); a fourth layer of ethylene vinyl acetate copolymer (EVA) with nine to twenty percent by weight vinyl acetate, with narrow molecular weight distribution, and a high degree of short chain branching; and a fifth layer of an ethylene alpha olefin copolymer (EAO) (again of a density less than about 0.915 g/cc). It is preferred that the film according to this invention, when it has a PVDC barrier layer, be made according to the extrusion coating process out-lined and described in U.S. Pat. No. 3,741,253 (Brax, et al.), which is incorporated herein by reference.

In preparation of the multilayer film according to the present invention, the extrusion coating method may be used. Layers one and two are coextruded through a conventional tubular extruder to form a tube. After leaving the die, the substrate is cooled and flattened. At this point, layers one and two are electron beam cross-linked at about 4.5 megarads (MR). Depending on the characteristics desired, this dosage can vary from two to twenty MR. Layers three, four and five are then extrusion coated onto layers one and two, and the tape is then quenched and accumulated.

It is generally recognized that irradiation with high energy electrons can be harmful to PVDC barrier layer compositions as such irradiation can degrade and discolor PVDC, making it turn brownish. The use of extrusion coating according to the present invention therefore allows for the irradiative treatment of layers one and two without subjecting the PVDC layer extrusion coated thereto to the harmful effects of the irradiation.

After receiving the final extrusion coating of layers three, four and five, the seamless tape is cooled, collapsed and rolled-up. The tape is subsequently unrolled, fed through a bath of hot water held at 175° F. to 210° F., and as it leaves the hot water the tape is oriented by being inflated and blown both in the machine direction and the transverse direction into thin tubing. This orientation is the well known trapped bubble technique which imparts a heat shrinkable property to the film.

After being stretched, the film is quickly cooled while substantially retaining its stretched dimensions to cool the film rapidly and therefore set the oriented molecular configuration. Once the orientation is set, the film is then rolled up for further processing. Control of the hot bath temperature determines the ultimate shrinkage, optics and toughness of the tubing.

A heat-shrinkable film will shrink when exposed to an appropriate temperature, typically 85 to 90° C., at least 5% in at least one of the transverse or machine directions.

The film has a barrier layer according to a preferred embodiment of this invention. The barrier material may be made of any of the known barrier polymeric resins such as PVDC, EVOH, or nylon. Barrier means a good barrier to the transmission of gases such as oxygen. Preferably, the barrier material is a vinylidene chloride copolymer. The term "saran" or PVDC refers to a vinylidene chloride copolymer wherein a major amount of the copolymer comprises vinylidene chloride and a minor amount of the copolymer comprises one or more unsaturated monomers copolymerizable therewith. When PVDC is not used as a barrier material (i.e. the barrier is a material such as EVOH or nylon, or a barrier is not used at all), the film is preferably fully co-extruded and then, if desired, post electron-beam irradiated since polymers other than PVDC materials do not discolor from irradiation like PVDC does.

The second and fourth layers of a preferred embodiment of the film according to this invention comprise an ethylene vinyl acetate copolymer (EVA) which has narrow molecular weight distribution and has a high degree of short chain branching. The EVA comprises nine to twenty percent by weight vinyl acetate. This EVA provides more heat shrinkability in a multilayer film made from the EVA, other factors being equal, than prior art EVAs at equivalent levels of vinyl acetate. Utilization of this EVA can further provide improved optics and improved strength characteristics.

Preferred EVA resins have a VA ranging from 11 to 18% VA, more preferably 13 to 16% VA, most preferably 15% VA.

Narrow molecular weight distribution is determined by the use of a gel permeation chromatograph on the EVA polymer resin. "Narrow molecular weight distribution" as used here means a polydispersity ratio ($M_z/M_n$, not the conventional industry standard of $M_w/M_n$) of 5 to 10, more preferably 6 to 8. The number average molecular weight ($M_n$) should be between about 15,000 and 30,000, more preferably between about 20,000 and about 25,000, with a standard deviation of about 1,000.

The phrase "high degree of short chain branching" is used here to mean the total short chain branching including the short chain branching inherent in the base low density polyethylene resin (LDPE) as well as the short chain branching induced by the use of telogens in the polymerization process. The extent of short chain branching can be derived for the EVA copolymer by carbon 13 NMR (nuclear magnetic resonance) testing.

A further processing step can be taken to make end seal bags by transversely sealing and severing across the seamless tubular film as it is laid flat to make individual bags. Side sealed bags may be made by slitting the seamless tubular film along one of its edges after which it is transversely sealed and severed into bags. The side seals are the sealing and severing seams and the bottom of the bag is the unslit edge of the film. Other bag and pouch making methods known in the art may be readily adapted to making receptacles from the multilayer film according to the present invention.

The film can be further utilized as are other materials of the heat-shrinkable (oriented) types. After a product, such as a food product, is wrapped with the film, the enclosed product can be subjected to elevated temperatures, for example, by passing the enclosed product through a hot air tunnel or by placing the enclosed product in hot water. The enclosing heat shrinkable film is thereby caused to shrink around the product to produce a tight wrapping that closely conforms to the contour of the product therein.

The invention can be further understood by reference to the following examples and data.

EXAMPLES

Test structures with EP4062-2 and Elvax 3150 were evaluated for free shrink, clarity and impact. EP 4062-2 is a 15% VA EVA from dupont. Elvax 3150 is also a 15% VA EVA from dupont. The test structures were:

Ex. 1        EP4062-2     // Saran-MA / Elvax 3175 GC / EP4062-2
Comp. Ex 1   Elvax 3150 // Saran-MA / Elvax 3175 GC / Elvax 3150
Tape Gage:      15.6 //  2.4     /    1.25    /    4.75
                  Orientation Ratio(LxT): 3 × 4

The test structures were oriented at three deformation temperatures:

|    | Preheat °F. | Hotbath °F. |
|----|-------------|-------------|
| A: | 205         | 195         |
| B: | 194         | 187         |
| C: | 188         | 181         |

In the examples, Saran-MA is a vinylidene chloride/methyl acrylate copolymer from Dow. Elvax 3175 GC is an EVA with 28% VA, from dupont.

"Deformation Temperature" refers to the temperature to which a collapsed tape is reheated before being oriented e.g. by a blown bubble process. The pre-heat temperature is a first reheating, followed by the hotbath where the tape is heated in hot water, at the indicated temperature, just prior to the blown bubble step. Various pre-heat/hot bath temperature combinations are shown as "A", "B", and "C".

The physical property results* are:

|       |   | Avg % Free 200° F. | Shrink @* 185° F. | % Haze | Peak* Load (lb) | Energy to Break (ft. lb) |
|-------|---|--------------------|-------------------|--------|-----------------|--------------------------|
| Ex. 1 | A | 68                 | 49                | 4.8    | 29.4            | 1.25                     |
|       | B | 70                 | 59                | 4.3    | 32.7            | 1.31                     |
|       | C | 70                 | 60                | 4.6    | 38.7            | 1.37                     |
| Comp. | A | 71                 | 51                | 8.7    | 22.7            | 0.89                     |
| Ex. 1 | B | 71                 | 58.5              | 8.0    | 25.1            | 0.91                     |
|       | C | 70                 | 61.5              | 8.2    | 31.1            | 1.06                     |

*by standard ASTM tests.

The free shrink results of Example 1 and Comparative Example 1 are similar. Differences can be seen in % haze with Example 1 having approximately one half the haze of Comparative Example 1, and in instrumented impacts with Example 1 having higher results. The trend of higher impact values with decreasing deformation temperature is observed in both structures. The only significant difference between Example 1 and Comparative Example 1 is the molecular weight distribution of the EVA of the outer layers. Example 1 has a narrow MWD EVA (EP 4062-2) while Comparative Example 1 has a broad MWD EVA (Elvax 3150). The primary effect can be observed in the optic comparison with the NMWD polymer film having less haze than the broad MWD polymer film.

Other comparative information is gained from Exxon's 9% VA-EVA (LD 318.92) and 19% VA-EVA (LD 720.92). The following comparison can be observed:

|  | Resin ID | Temp | Avg % Free Shrink @ | | |
|---|---|---|---|---|---|
|  |  |  | 185° | 175° F. | 165° F. |
| Comp. Ex. 2 | 9% VA | A | 35.5 | 23.5 | 16.5 |
|  | Exxon | B | 36.0 | 25.5 | 17.5 |
|  |  | C | — | — | — |
| Ex. 2 | 15% VA | A | 38.5 | 23.5 | 16.5 |
|  | duPont | B | 49.5 | 32.5 | 23.5 |
|  |  | C | 54.5 | 39.5 | 28 |
| Comp. Ex. 3 | 19% VA | A | 45 | 33 | 21 |
|  | Exxon | B | 51 | 35.5 | 22 |
|  |  | C | 59 | 41 | 30 | where the total film structures in each case were:
Comp. Ex. 2   EVA/LD 318.92   //  Saran-MA  /  LD 318.92
Ex. 2        EVA/EP 4062-2   //  Saran-MA  /  EP 4062-2
Comp. Ex. 3   EVA/LD 720.92   //  Saran-MA  /  LD 720.92 and where the "average % free shrink" was derived by adding the values for shrink, in both the longitudinal and transverse directions, at the given temperature, and dividing by 2, i.e. L+T/2.

The EVA of the first layer of Ex. 2 and comparative Examples 2 and 3 is an 8.9% VA EVA, Elvax 3128, available from dupont.

A graph of this information (see FIG. 1) shows that film made from the duPont 15% VA-EVA (i.e. EP-4062-2) would be 5% higher on average (or 10% total free shrink taking into account both the longitudinal and transverse free shrink improvements) than film made from a 15% VA-EVA from Exxon if a linear relationship is assumed for the Exxon data from 9–19% VA. The 9% Atochem data point indicates the improvement in shrink of the film made from Atochem 1020V at 9% VA-EVA versus a 9% VA-EVA from Exxon. The Atochem EVA has a narrow molecular weight distribution and high degree of short chain branching.

Additional comparative information on LD 720.92 vs. EP4062-2 is on orientation speeds. Test structures compared were:

| Ex. 3 | 70 Attane 4202 / EP 4062-2 // Saran-MA / EP 4062-2 30 LD 318.92 / |
|---|---|
| Comp. Ex. 4 | 70 Attane 4202 / LD 720.92 // Saran-MA / LD 720.92 30 LD 318.92 / |
|  | Attane 4202 is a VLDPE (ethylene/octene copolymer) from Dow. |

Normalized S-Roll Speed (fpm) at Varying Deformation Temperatures

| Def. Temp | A | B | C |
|---|---|---|---|
| Ex. 3 | 1.00 | 1.34 | 1.09 |
| Comp. Ex. 4 | 1.00 | 1.08 | 1.00 |

"S-Roll" herein is the roll around which reheated film passes just prior to orientation by the blown bubble technique.

At the high deformation temperature (A=195° F.) the orientation speeds are equivalent. At lower temperatures Example 3 has faster racking (orienting) speeds than Comparative Example 4. The peak orientation speed appears to be around condition B (187° F.), where the orientation speed was improved (increased) by about 24%.

The following is a summary of analytical data:

|  |  | GPC Analysis | | |
|---|---|---|---|---|
| Resin ID | % VA | $M_z(10^3)$ | $M_w(10^3)$ | $M_n(10^3)$ |
| LD 318.92 | 9 | 282 | 92.8 | 22.4 |
| Atochem 1020V | 9 | 112 | 56.2 | 17.1 |
| EP4062 | 15 | 190 | 71.5 | 22.0 |

The calculated $M_z/M_n$ for these resins is:
LD 318.92 12.6
Atochem 1020V 6.5
EP4062 8.6

|  | DSC ANALYSIS | | | |
|---|---|---|---|---|
|  | 1st Melt | Cooling Peak | 2nd Melt | Tg |
| Atochem 1020V | 94.9° C. | 78.6° C. | 95.4 | 35.5° C. |
| LD 318.92 | 98.2° C. | 81.2° C. | 98.4 | 46.6° C. |

Many variations will be apparent to those of skill in the art after a review of the present specification, and such variations are embodied within the spirit and scope of the present invention as measured by the following appended claims.

What is claimed is:

1. A heat shrinkable film having improved shrink characteristics comprising ethylene vinyl acetate copolymer with nine to twenty percent by weight vinyl acetate, with narrow molecular weight distribution defined by a polydispersity ratio ($M_z/M_n$) of 5 to 10 wherein the number average molecular weight ($M_n$) is between about 150,000 and 30,000.

2. The film of claim 1 wherein the film is cross-linked.

3. The film of claim 2 wherein the film is electron beam cross-linked.

4. The film of claim 1 wherein the film has been formed by coextrusion.

5. The film of claim 1 wherein the film is in the form of a seamless tube.

6. A bag formed from tubular film according to claim 1 wherein the bottom of the bag is formed by a transverse seal across the flattened tube and the mouth is formed by severing the tube at a predetermined distance from said transverse seal.

7. The bag of claim 6, heat-shrunk about a contained food product.

8. A multilayer heat shrinkable film comprising:
   a) a first layer comprising a material selected from the group consisting of an acid copolymer, an ethylene alpha olefin copolymer, and blends thereof; and
   b) a second layer comprising ethylene vinyl acetate copolymer with nine to twenty percent by weight vinyl acetate, with narrow molecular weight distribution defined by a polydispersity ratio ($M_z/M_n$) of 5 to 10 wherein the number average molecular weight ($M_n$) is between about 15,000 and 30,000.

9. The film of claim 8 wherein at least one layer is cross-linked.

10. The film of claim 9 wherein at least one layer is electron beam cross-linked.

11. The film of claim 8 wherein the first and second layers have been formed by coextrusion.

12. The film of claim 8 wherein the film is in the form of a seamless tube with the first layer being the face of the inner tube wall.

13. The film of claim 8 wherein the ethylene alpha olefin copolymer has a density of less than about 0.915 g/cc.

14. The film of claim 8 wherein said acid copolymer of the first layer is ethylene-methacrylic acid, ethylene-acrylic acid, or a blend thereof.

15. A bag formed from tubular film according to claim 12 wherein the bottom of the bag is formed by a transverse seal across the flattened tube and the mouth is formed by severing the tube at a predetermined distance from said transverse seal.

16. The bag of claim 15, heat-shrunk about a contained food product.

17. A multilayer heat shrinkable film comprising:
 a) a first layer comprising a material selected from the group consisting of an acid copolymer, an ethylene alpha olefin copolymer, and blends thereof,
 b) a second layer comprising ethylene vinyl acetate copolymer with nine to twenty percent by weight vinyl acetate, with narrow molecular weight distribution defined by a polydispersity ratio ($M_z/M_n$) of 5 to 10 wherein the number average molecular weight ($M_n$) is between about 15,000 and 30,000;
 c) a third layer comprising a barrier copolymer,
 d) a fourth layer comprising ethylene vinyl acetate copolymer with nine to twenty percent by weight vinyl acetate, with narrow molecular weight distribution defined by a polydispersity ratio ($M_z/M_n$) of 5 to 10 wherein the number average molecular weight ($M_n$) is between about 15,000 and 30,000; and
 e) a fifth layer comprising an ethylene alpha olefin copolymer.

18. The film of claim 17 wherein at least one layer is cross-linked.

19. The film of claim 18 wherein at least one layer is electron beam cross-linked.

20. The film of claim 17 wherein the third, fourth and fifth layers are extrusion coated onto a substrate tape, and the substrate includes the first and second layers.

21. The film of claim 17 wherein all the layers have been formed by coextrusion.

22. The film of claim 17 wherein the film is in the form of a seamless tube with the first layer being the face of the inner tube wall.

23. The film of claim 17 wherein the ethylene alpha olefin copolymer has a density of less than about 0.915 g/cc.

24. The film of claim 17 wherein said acid copolymer of the first layer is ethylene-methacrylic acid, ethylene-acrylic acid, or blends thereof.

25. A bag formed from tubular film according to claim 22 wherein the bottom of the bag is formed by a transverse seal across the flattened tube and the mouth is formed by severing the tube at a predetermined distance from said transverse seal.

26. The bag of claim 25, heat-shrunk about a contained food product.

* * * * *